United States Patent [19]
Czyzewski et al.

[11] 3,998,685
[45] Dec. 21, 1976

[54] APPARATUS AND PROCESS FOR MAKING AN OFFSET LAMINATED ROOFING SHINGLE AND ROOFING SHINGLE MADE THEREBY

[75] Inventors: Edward S. Czyzewski, St. Petersburg; Donald C. Portfolio, Tampa; Lee Schuster, Clearwater; Louis M. Wisner, Largo, all of Fla.

[73] Assignee: The Celotex Corporation, Tampa, Fla.

[22] Filed: Feb. 18, 1976

[21] Appl. No.: 658,908

Related U.S. Application Data

[63] Continuation of Ser. No. 455,991, March 29, 1974, abandoned.

[52] U.S. Cl. .................. 156/260; 156/279
[51] Int. Cl.² ..................... B32B 31/00
[58] Field of Search ........ 156/259, 260, 271, 512, 156/554, 337; 428/281

[56] References Cited
UNITED STATES PATENTS

| | | | |
|---|---|---|---|
| 523,544 | 7/1894 | McTear | 428/298 |
| 1,325,546 | 12/1919 | Wardell | 428/281 |
| 1,705,015 | 3/1929 | Irving | 428/491 |
| 1,794,674 | 3/1931 | Cumfer | 156/260 |
| 1,829,886 | 11/1931 | Yates et al. | 156/260 |
| 1,950,840 | 3/1934 | Cook | 156/271 |
| 2,164,508 | 7/1939 | Fasold | 156/271 |
| 2,636,543 | 4/1953 | Groskopf | 156/337 |
| 3,236,713 | 2/1966 | Taff | 156/271 |
| 3,532,582 | 10/1970 | Franke | 156/271 |

Primary Examiner—Douglas L. Drummond
Attorney, Agent, or Firm—James W. Grace

[57] ABSTRACT

An apparatus cuts a saturated sheet into wide and narrow sheets, coats the top and bottom surfaces of the wider sheet with bituminous coating adhesive, shifts the location of the narrower sheet to a position so that the centerlines of each sheet are in alignment, coats the back of the narrower sheet with bituminous adhesive, and laminates the aligned sheets with the narrower sheet adhered to the bottom surface of the wider sheet. The sheets are then cooled, cut into predetermined shapes and packaged. The shaped laminated shingle is also claimed.

5 Claims, 6 Drawing Figures

Figure 2:
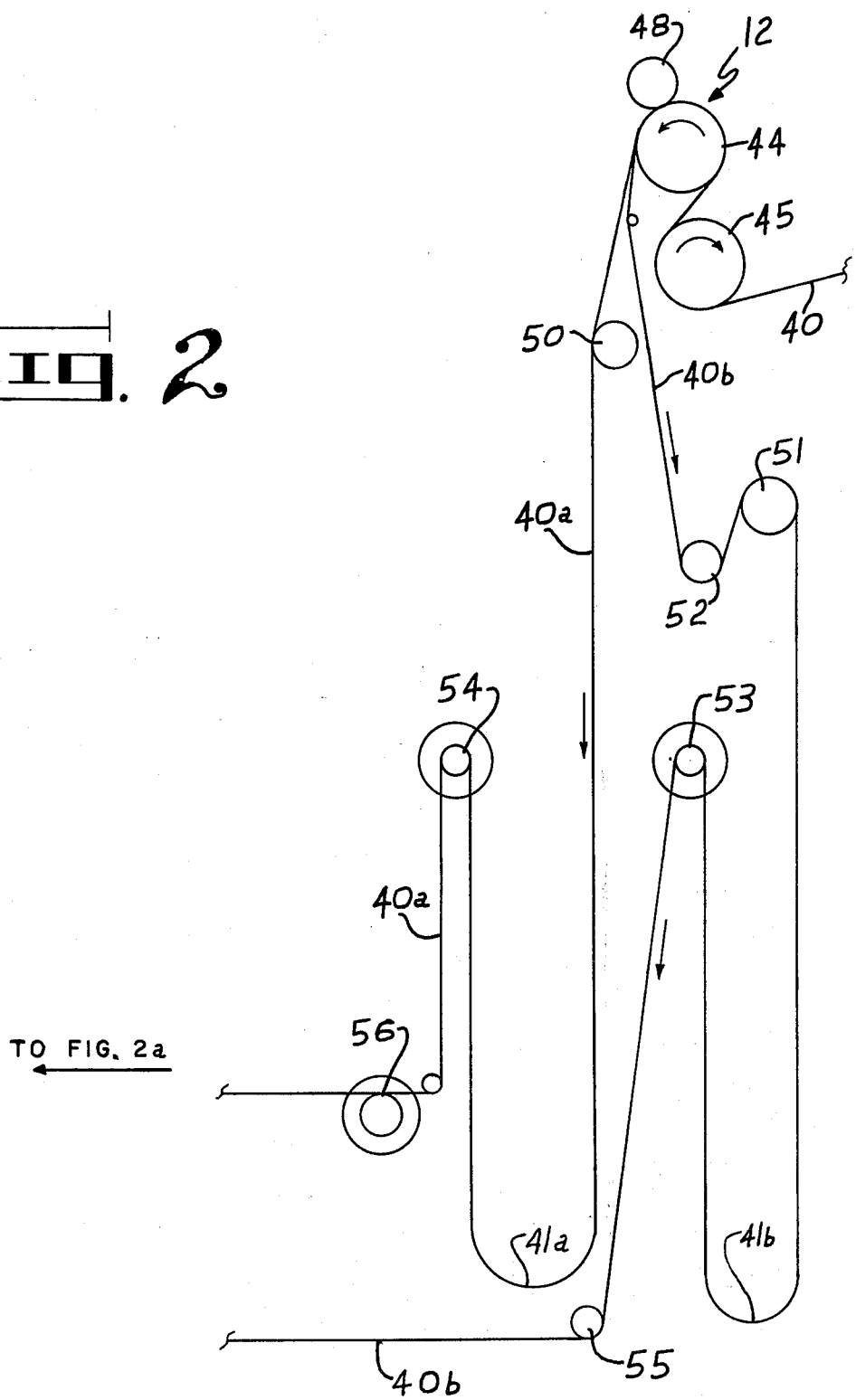

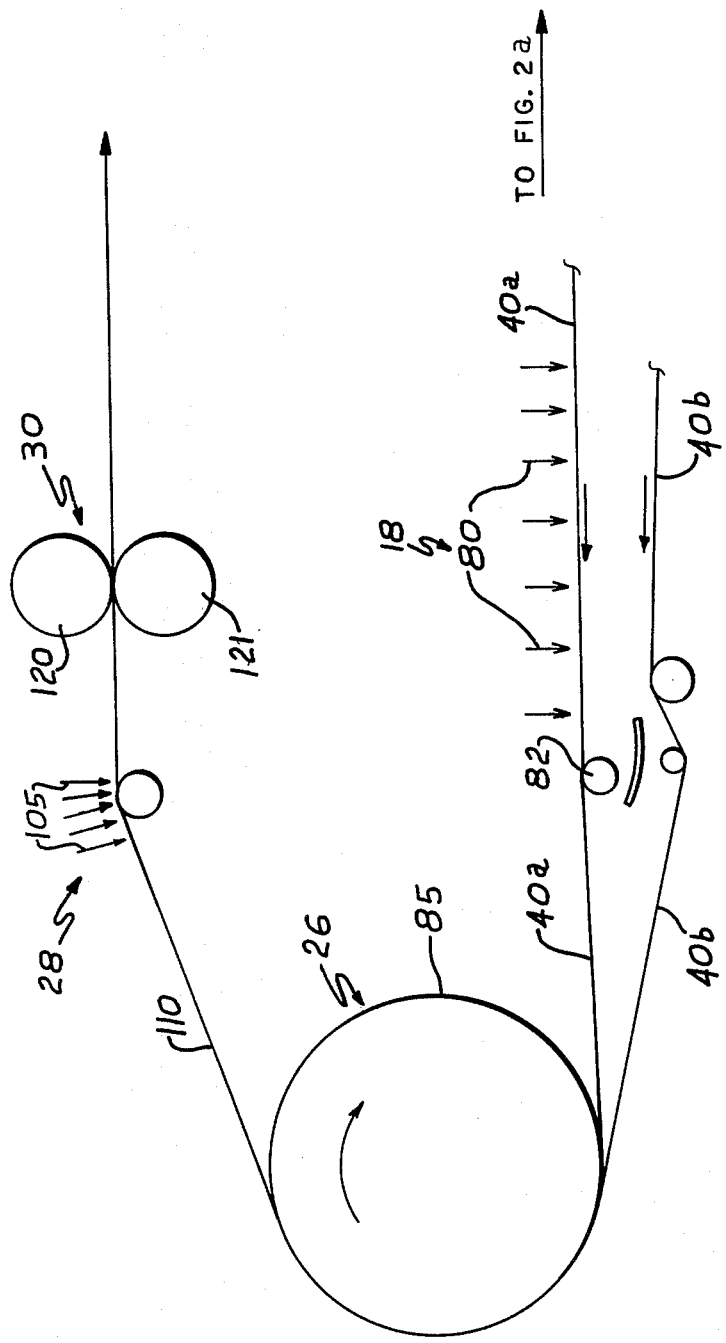
Fig. 2.b

3,998,685

APPARATUS AND PROCESS FOR MAKING AN OFFSET LAMINATED ROOFING SHINGLE AND ROOFING SHINGLE MADE THEREBY

This is a continuation of application Ser. No. 455,991, filed 3/29/74, now abandoned.

BACKGROUND OF THE INVENTION

1. Field of the Invention:

This invention pertains to the field of roofing shingles and rolls.

2. Description of the prior Art:

Roofing shingles have been made in a continuous process in which the apparatus which received a felted sheet, immersed the sheet into a bath of bituminous material to saturate the sheet. The saturated sheet then has a coating of bituminous coating adhesive spread over its top and bottom surface. Slate roofing granules are applied to its top surface and a fine powder or sand is applied to the bottom surface. The shingle is then cut into a conventional size of 12 inches by 36 inches for packaging.

A more recent development which is thought to enhance the appearance of the finished shingle roof comprises a two-layer shingle in which a narrow strip of asphalt saturated felt is adhered along the exposed edge of the shingle to give the roof an improved appearance by presenting to the viewer's eye a thicker edge for the shingle. However, the laminating was accomplished by cutting shingles of two different widths at different times on the roofing machine and then in a hand operation laminating the narrower strip to the underside of the wider or conventional size shingle. The extra operation has proved to be cumbersome and the additional conveying and handling apparatus costly and space consuming. The extra laminating operation also presented problems in exactly aligning the two exposed edges of the laminates and achieving good adhesion.

Prior art laminated shingles have had offset edges where the two laminates meet or have had a continuous uncut wider sheet with a cut-out upper sheet.

SUMMARY OF THE INVENTION

This invention provides a process and apparatus which automatically and in a continuous and uninterrupted manner laminates a narrow strip of bituminous saturated and coated felt to the bottom side of a coated, saturated felt, and in which the cutting of the laminated product takes place along the exposed edge.

It is an object of the present invention to provide a novel apparatus for making a laminated roofing shingle in a continuous operation.

It is a further object of the invention to provide a novel apparatus which produces a laminated roofing shingle with a minimum of hand labor.

It is still another object of the present invention to provide a roof shingle of novel shape.

It is yet another object of the invention to provide a novel process for making a laminated roofing shingle in a continuous manner.

Figure 1:
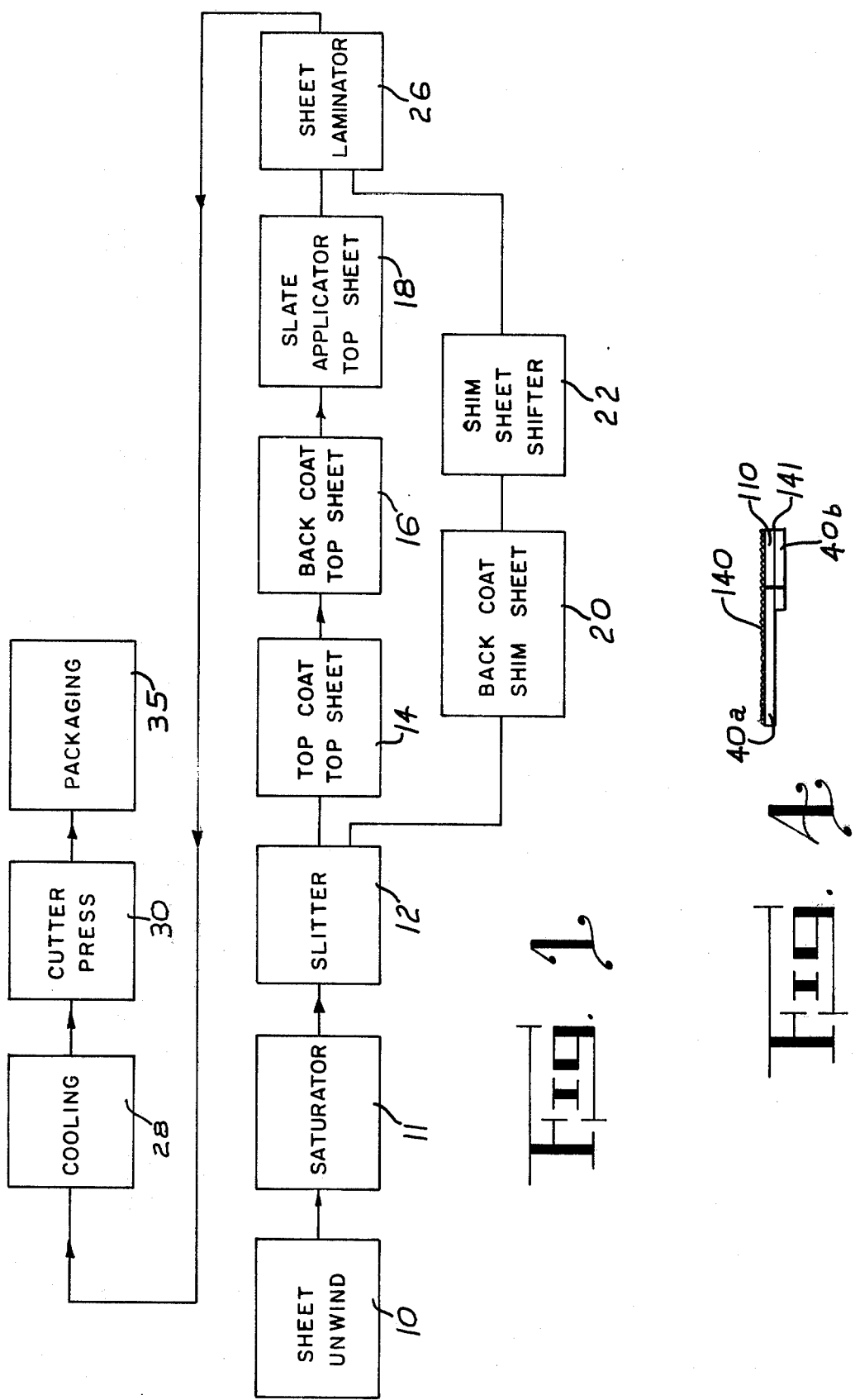
Figure 2A:
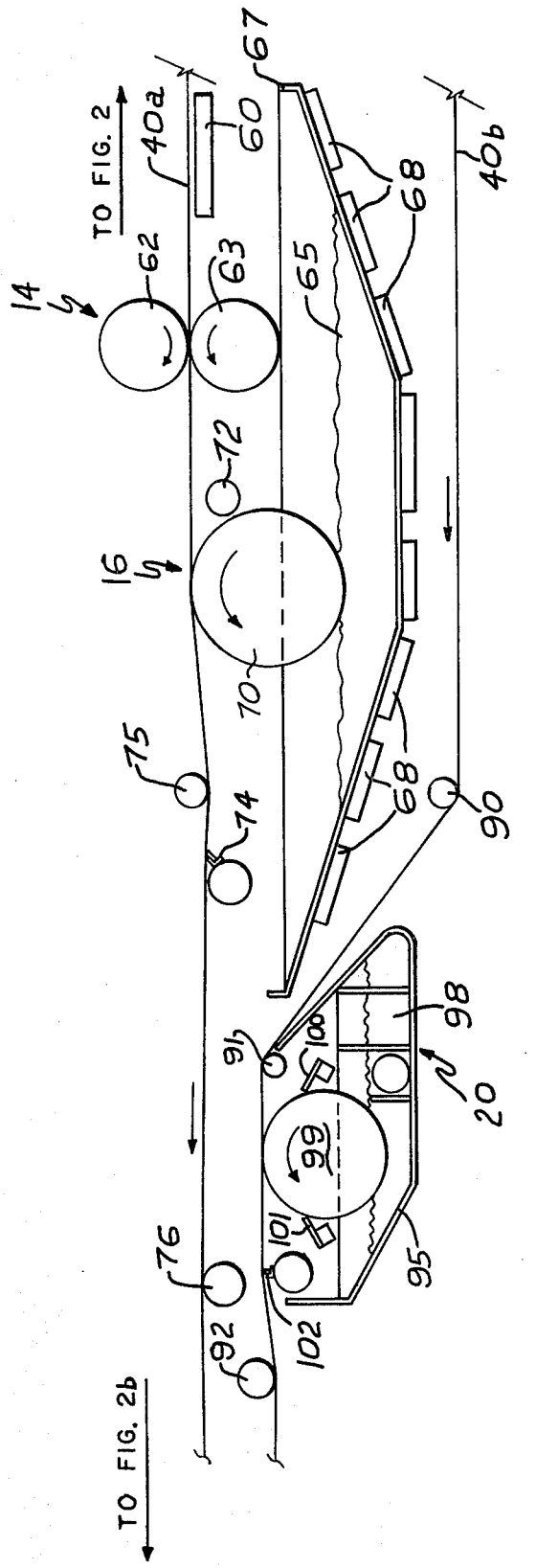
Figure 3:
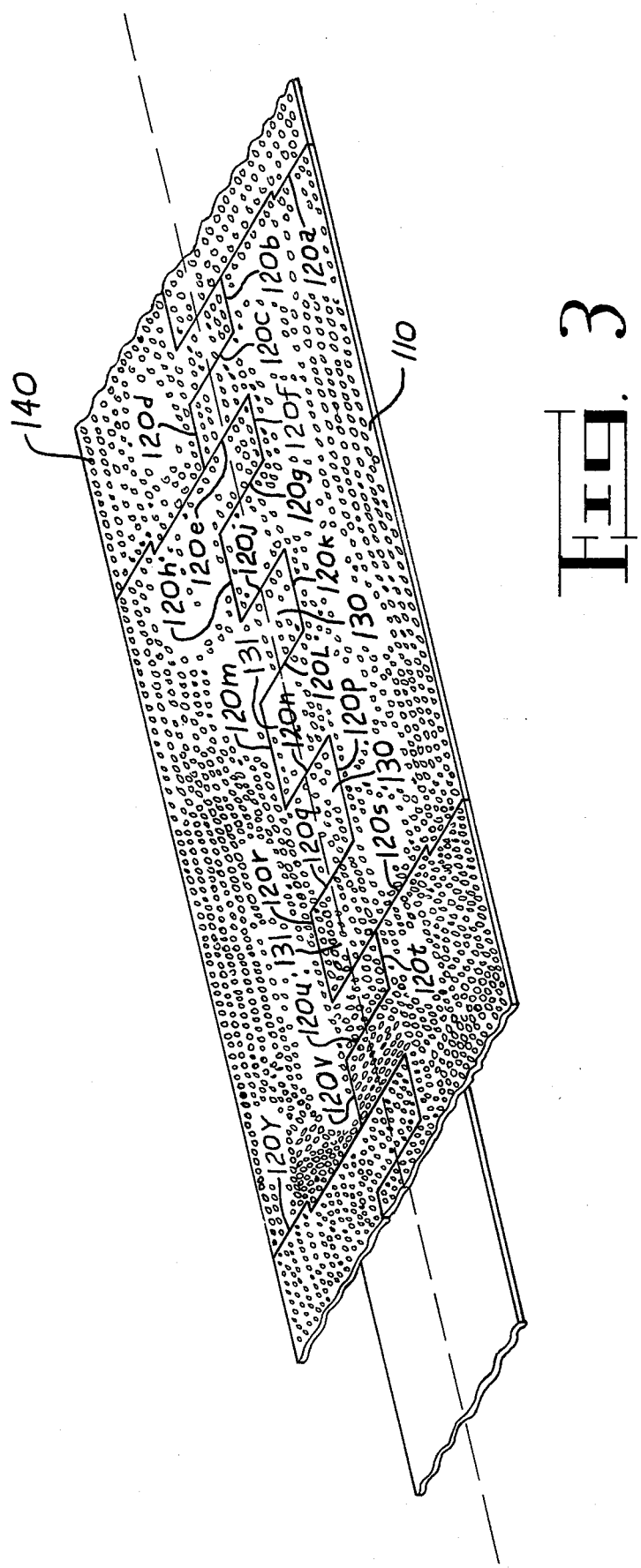

Other features and objects of the present invention will become apparent to those skilled in the art when the present description is considered in the light of the accompanying drawings in which like numerals indicate like elements and in which:

FIG. 1 is a flow diagram useful in explaining the novel process of manufacturing the novel roofing shingle of the invention;

FIGS. 2, 2a, and 2b are simplified elevational views of the novel apparatus of the invention;

FIG. 3 is a perspective view of the top and bottom sheets laminated together after passing through the cutter press, and FIG. 4 is an end view of one roofing shingle after the two symmetrical pieces have been separated.

Referring now to the drawings and more specifically to FIG. 1 thereof, there is shown a flow diagram of the novel process of laminating and cutting the laminated sheet to produce a novel roofing shingle. It will be recognized that many of the basic steps of manufacture of the shingle are conventional and are carried out by well-known standard apparatus to be found in any roofing plant. The invention resides in the novel process, the arrangement of the elements of the apparatus and in the final product, the roofing shingle per se.

Hence, in order to avoid undue complexity and to describe the invention in as concise a fashion as possible, the individual pieces of apparatus such as conventional electric motors, bearings, shafts, rolls, conveyors, frames, nuts, bolts, etc., have not been described.

The process may be described by observing the flow sheet of FIG. 1 and following the arrow which may represent the sheet in its initial condition as a roll of felted paper to the finished shingle.

The initial sheet is most generally of suitable felted paper or rag felt of approximately 112 pounds per 1,000 square feet, about 68 mils in thickness. For purposes of this invention, the sheet will preferably be 33 inches in width, or multiples thereof, although other widths can be chosen without departing from the scope of the invention. The sheet, as supplied by the manufacturer, is wound on a mandrel or core which is suspended on a bracket to permit unwinding of the sheet. The sheet unwind station is indicated by the numeral 10.

The sheet is subjected to a saturation step in saturator 11. Generally, the sheet is formed in a series of loops the lower portions of which are submerged in a bath of hot liquid asphalt for a period of time sufficient to thoroughly saturate the sheet. Any moisture remaining in the sheet is driven off.

The sheet is then fed to a slitter 12 which can be a conventional bevelled cutting wheel with an anvil roll on the opposite of the sheet. For purposes of the invention, the original 33 inch sheet is cut to form two sheets; one 25 inches wide and the other 8 inches wide.

The wider of the two sheets is fed to a top coat station 14 where an asphalt top coat is applied to the previously saturated sheet. At the next station 16, the underside of the wider sheet passes over a back coater which applies to it a coat of hot asphalt.

Standard granules are dropped on the upper asphalt coating of the upper sheet at the slate applicator station 18. It should be understood that the formation of an asphalt saturated sheet with top and bottom coatings and a layer of granules embedded in the top coat is accomplished in a conventional way well known to those skilled in the art using well-known machinery.

The narrower sheet is concurrently moving through a back coating step 20 where the underside of the narrower (8 inch) sheet is coated with an asphalt coating. Following this coating, the narrower strip is shifted over at station 22 so that the centerline of the narrower strip is coincident with the centerline of the wider strip.

It will be recalled that the underside of the wider sheet has an asphalt coating thereon. At station 26, the two sheets are brought into contact with the centerline of the narrower sheet being coincident with the centerline of the wider sheet. The wider sheet has a coating of granules on its upper surface.

The now laminated sheet continues through a cooling zone 28, a shingle cutting apparatus 30 cuts the laminated sheet into two separate sheets with the double layer along one exposed edge (shown more fully in FIGS. 3 and 4 hereinafter).

Suitable standard packaging apparatus 35 may be used to collect, package and wrap the finished roofing shingle for storage.

Having described the process with the flow diagram, reference may now be made to FIGS 2, 2a and 2b for more detailed description of the apparatus. For purposes of simplifying the description, the apparatus for handling, unwinding the sheet and saturating the sheet, will not be described since these are conventional and well-known pieces of equipment. Also the parts of the apparatus shown in block diagram form in FIG. 1 will be designated generally by the same numerals in FIGS. 2, 2a and 2b.

Starting at the right-hand edge of FIG. 2, saturated sheet 40 is pulled by rolls 44 and 45 from the saturator (not shown). A slitter 48, which may be a bevelled blade driven on a shaft by a suitable motor (not shown), cuts saturated sheet 40 into two portions; a wide sheet 40a and a narrow sheet 40b. As previously discussed, sheet 40 was preferably 33 inches wide while sheet 40a is 25 inches wide and sheet 40b is 8 inches wide. obviously these dimensions are not critical but have been selected for the purpose of designing an attractive finished product.

Sheets 40a and 40b form loops 41a and 41b respectively by means of pull rollers and guide rollers 50—56. Pull rollers and guide rollers 50—56 are conventional means for pulling and guiding sheets of saturated felt through a roofing machine.

Referring now to FIG. 2a, sheet 40a is conveyed across the upper surface of a table 60 and between rolls 62 and 63. Roll 62 applies a coat of hot asphalt over the upper surface of sheet 40a from a pool 65 of hot asphalt maintained in a tank 67. Heaters 68 keep the coating asphalt at the proper temperature for application. Back up roll 63 keeps sheet 40a in contact with the application roll 62 during the coating operation. Sheet 40a proceeds past back coating roller 70 which, with a doctor roll 62 to control thickness, applies a coating of hot liquid asphalt 65 to the back or under surface of sheet 40a. A doctor blade 74 removes excess coating from the back or under surface of sheet 40a. Guide and driving rolls 75 and 76 pull sheet 40a along.

Referring now to FIG. 2b, roofing granules are dropped on the upper surface of sheet 40a where they become embedded in the top asphalt coat. The application of the granules is indicated by the arrows 80. The granules are fed from a granule hopper (not shown) and applied in a conventional manner. Sheet 40a continues over guide roll 82 to the outer surface of a laminating roll 85. Laminating roll 85 also serves to press the granules firmly into the top coating of asphalt on the upper surface of sheet 40a.

Reverting now to sheet 40b and to FIG. 2a, sheet 40b is moved below tank 67 and across guide rolls 90, 912 and 292.

At station 20 a tank 95 holds hot liquid asphalt 98 and a roll coater 99 is partially immersed in asphalt 98 and contacts the under surface of shim sheet 40b to apply an undercoating thereto. Suitable doctor blades 100, 101 and 102 adjust the thickness of the coating on shim sheet 40b.

Sheet 40 proceeds to station 22 where it is shifted over so that its centerline is coincident with the centerline of sheet 40a. It is not necessary that the location of the shifting apparatus for repositioning shim sheet 40b be located after the coating operation, but it is sufficient that this shift take place between cutter 48 and laminating roll 85.

It will be recalled that sheet 40a runs over the outer periphery of laminating roll 85. As can be seen now, sheet 40b, which is 8 inches wide, lies against the underside of sheet 40a, which is 25 inches wide. The centerlines of the sheets are coincident. The asphalt coating applied to the under surface of sheet 40a serves as an adhesive to form a laminated sheet 110.

A cooling section 28, which may be cooling drums or simply a water spray system 105, lowers the temperature of the laminated sheet 110 to set the adhesive action of the coating between 40a and shim sheet 40b.

After cooling, laminated sheet 110 passes through a cutting drum 120 which, in conjunction with a back-up drum 121, cuts sheet 110 into two separable strips. The outer surface of drum 120 has a preset pattern so that the two strips emerging therefrom have repeated interdigitating tabs 130 and 131 as shown in FIG. 3, Sheet 110 is separated into individual roofing shingles.

As can be seen in FIG. 3, an individual shingle is cut from sheet 110 and may be identified as outlined by the cut lines identified by numerals 120a through 120s. Another shingle which is cut with interdigitating tabs 130, may be defined by cut lines identified by numerals 120e through 120y.

FIG. 4 shows a cross-section view of one of the two separated shingles after the cutting operation 30. Granules 140 are embedded in a top coating of sheet 40a which is laminated at 141 to lower sheet 40b along a line of adhesive provided by the asphalt coating on the underside of sheet 40a. It is thus seen that the right hand edge of shingle 110 is twice the thickness of a single sheet but it is not necessary that the two sheets 40a and 40b be the same width.

Certain changes can be made in the process, if desired. For example, it would be possible to perform the slitting operation which forms sheets 40a and 40b out of sheet 40 at a location other than that shown. Sheet 40 could be left intact until after it has been top coated and the granules applied. Then, after slitting, sheets 40a and 40b could be laminated leaving a layer of granules between the two sheets. This process would produce a thicker butt shingle without adding appreciably to the complexity of the process.

In order to show that much of the general machinery and process is well known to those skilled in the art, it is intended to incorporate in this disclosure the following publication:

"Manufacture, Selection and Application of Asphalt Roofing and Siding Products" by N. L. Strahan and published by Asphalt Roofing Manufacturers Association of 757 Third Avenue, New York, New York 10017, copyrighted, 1966.

In summary, there has been disclosed an apparatus, and process for making a novel roofing shingle by cutting a single web into two parts, laminating the two parts with coincident centerlines, and then cutting a thick butt roofing shingle from the laminated product on a continuous line. The novel structural arrangement of the apparatus and the novel roofing shingle are described.

We claim:

1. The method of making a roofing shingle from an asphalt saturated felt in continuous process from felt unwind to individual roofing shingles comprising the steps of thoroughly saturating said felt with a bituminous liquid, longitudinally cutting said felt into a first sheet having a top side and an underside and a second sheet having a top side and an underside, laterally shifting one of said sheets with respect to the other of said sheets in spaced overlying relationship so that each of said sheets has its centerline coincident with the centerline of the other of said sheets and so that the underside of said first sheet faces the top side of said second sheet, applying a continuous surface coating of molten bitumen to both sides of said first sheet, applying a continuous surface coating of molten bitumen to said underside only of said second sheet, applying a coating of granules to the top side of said first sheet, laminating said sheets together to form a unitary layered sheet, with at least one of said sheets being laminated over its full surface area to the other of said sheets, cutting said layered sheet into pieces having interdigitating tabs, and separating said pieces for packaging.

2. The method of making a roofing shingle as recited in claim 1 in which the step of longitudinally cutting said felt occurs along a longitudinal line offset from the centerline of said felt, whereby the said two sheets are of unequal width; and in which said first sheet is wider than said second sheet.

3. The method of making a roofing shingle as recited in claim 2 in which the step of shifting one of said sheets places said wider sheet above said other of said sheets.

4. The method of making a roofing shingle as recited in claim 2 in which the step of shifting is followed by the step of coating the under surface of said wider sheet with a layer of adhesive.

5. The method of making a roofing shingle as recited in claim 4 in which said under surface coating step is followed by the step of applying an adhesive coat to the upper surface of said wider sheet followed by the step of applying and embedding granules into said coating on said upper surface.

* * * * *